US009206874B2

(12) United States Patent
Sugata (10) Patent No.: US 9,206,874 B2
(45) Date of Patent: Dec. 8, 2015

(54) DAMPER WITH AIR SPRING

(71) Applicant: SHOWA CORPORATION, Gyoda-shi (JP)

(72) Inventor: Norihisa Sugata, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/028,824

(22) Filed: Sep. 17, 2013

(65) Prior Publication Data

US 2014/0175716 A1 Jun. 26, 2014

(30) Foreign Application Priority Data

Dec. 25, 2012 (JP) ................................ 2012-281736

(51) Int. Cl.
| | |
|---|---|
| *F16F 9/02* | (2006.01) |
| *F16F 9/088* | (2006.01) |
| *B60G 15/12* | (2006.01) |
| *B60G 15/14* | (2006.01) |
| *F16F 9/04* | (2006.01) |

(52) U.S. Cl.
CPC ................ *F16F 9/088* (2013.01); *B60G 15/12* (2013.01); *B60G 15/14* (2013.01); *F16F 9/0472* (2013.01); *B60G 2202/152* (2013.01); *B60G 2202/24* (2013.01); *B60G 2204/45* (2013.01)

(58) Field of Classification Search
CPC ................. B60G 2202/314; B60G 2204/1262; B60G 15/14; F16F 9/05
USPC .......... 267/64.15, 64.19, 64.21, 64.23, 64.24, 267/64.27
See application file for complete search history.

(56) References Cited

U.S. PATENT DOCUMENTS

| | | | |
|---|---|---|---|
| 3,399,882 A | 9/1968 | Hausmann | |
| 4,022,448 A | 5/1977 | Reeder | |
| 4,316,604 A | 2/1982 | Makita | |
| 4,518,154 A * | 5/1985 | Merkle | ............... 267/34 |
| 4,588,171 A * | 5/1986 | Stephens | ............ 267/64.24 |
| 4,648,623 A | 3/1987 | Cameron | |
| 4,688,774 A * | 8/1987 | Warmuth, II | ........ 267/64.21 |
| 4,742,996 A | 5/1988 | Gold | |
| 4,911,416 A * | 3/1990 | Warmuth, II | ........ 267/64.24 |
| 5,129,634 A | 7/1992 | Harris | |
| 5,460,354 A | 10/1995 | Easter | |
| 6,286,820 B1 * | 9/2001 | Raulf et al. | ........... 267/64.21 |
| 6,843,472 B2 * | 1/2005 | Henry et al. | .......... 267/64.24 |

(Continued)

FOREIGN PATENT DOCUMENTS

| | | | |
|---|---|---|---|
| DE | 3526156 A1 * | 1/1987 | ............ B60G 17/08 |
| DE | 3610144 A1 * | 10/1987 | ............ B60G 15/12 |

(Continued)

*Primary Examiner* — Bradley King
*Assistant Examiner* — Stephen Bowes
(74) *Attorney, Agent, or Firm* — Leason Ellis LLP (57) ABSTRACT

A damper with an air spring includes: a damper main body having a cylinder and a piston rod inserted into the cylinder; and a cylindrical diaphragm attached to a side of the cylinder at a first end thereof and to a side of the piston rod at a second end thereof and forming an air chamber around the damper main body, in which a first attachment case to which the first end of the diaphragm is attached is fitted on an outer periphery of the cylinder, and an inner-diameter step portion of the first attachment case is brought into abutting contact with an upper end portion of the cylinder in an axial direction thereof, while a second attachment case to which the second end of the diaphragm is attached is fixed to the piston rod.

7 Claims, 6 Drawing Sheets

(56) References Cited

U.S. PATENT DOCUMENTS

| | | | |
|---|---|---|---|
| 7,226,045 B2 * | 6/2007 | Brookes | 267/64.27 |
| 7,487,957 B2 * | 2/2009 | Brunneke et al. | 267/64.24 |
| 2007/0126163 A1 * | 6/2007 | Leonard et al. | 267/64.27 |
| 2010/0044937 A1 * | 2/2010 | Lee et al. | 267/113 |

FOREIGN PATENT DOCUMENTS

| | | | |
|---|---|---|---|
| DE | 19755549 A1 * | 10/1998 | |
| GB | 2084692 A | 4/1982 | |
| JP | 54-113993-UM A | 1/1978 | |
| JP | 55-121713-UM A | 2/1979 | |
| JP | 56-044990-Um A | 9/1979 | |
| JP | 57-060812-UM A | 9/1980 | |
| JP | 62-270839 A | 11/1987 | |
| JP | 63-025844-UM A | 2/1988 | |
| JP | 63-072930 A | 4/1988 | |
| JP | 63-157540-UM A | 10/1988 | |
| JP | 01-132832-UM A | 9/1989 | |
| JP | 04-119646-UM A | 10/1992 | |
| JP | 2011-117490 A | 6/2011 | |

\* cited by examiner

DAMPER WITH AIR SPRING

CROSS-REFERENCE TO RELATED APPLICATIONS

This application is based on and claims priority under 35 U.S.C. 119 from Japanese Patent Application No. 2012-281736 filed on Dec. 25, 2012, the entire content of which is incorporated herein by reference.

BACKGROUND

1. Technical Field

The present invention relates to a damper with an air spring.

2. Related Art

A damper with an air spring is available which includes a damper main body with a cylinder and a piston rod inserted into the cylinder and a cylindrical diaphragm which is attached to a side of the cylinder at a first end thereof and to a side of the piston rod at a second end thereof to form an air chamber around the damper main body. A method for attaching the first end of the diaphragm to the cylinder of the damper main body is based on welding or crimping.

The method based on welding involves welding a piston pipe to which the first end of the diaphragm is attached, to an outer periphery of the cylinder, as described in Patent Literature 1 (JP-A-2011-117490).

The method based on crimping involves fixing an attachment case to which the first end of the diaphragm is attached, to the outer periphery of the cylinder by crimping.

SUMMARY OF INVENTION

If the first end of the diaphragm is attached to a side of the cylinder of the damper main body by the welding method, a sliding range of the cylinder within which the piston slides needs to be prevented from undergoing welding distortion. Thus, a welded portion is limited to a lower end of the cylinder, which falls out of the sliding range, or the cylinder needs to be a double cylinder including an internal cylinder and an outer cylinder so that the welded portion is provided on the external cylinder over which the piston does not directly slide. As a result, the configuration of the damper is complicated.

If the first end of the diaphragm is attached to a side of the cylinder of the damper main body by the crimping method, the sliding range of the cylinder within which the piston slides needs to be prevented from undergoing crimping distortion. Thus, a crimped portion is limited to the lower end of the cylinder, which falls out of the sliding range, or the cylinder needs to be a double cylinder including an internal cylinder and an outer cylinder so that the crimped portion is provided on the external cylinder over which the piston does not directly slide. As a result, the configuration of the damper is complicated.

An object of the present invention is to provide a damper with an air spring which allows the first end of the diaphragm to be easily attached to a side of the cylinder of the damper main body.

[1] An aspect of the invention provides a damper with an air spring, including: a damper main body having a cylinder and a piston rod inserted into the cylinder; a cylindrical diaphragm attached to a side of the cylinder at a first end thereof and to a side of the piston rod at a second end thereof and forming an air chamber around the damper main body; a first attachment case to which the first end of the diaphragm is attached; and a second attachment case to which the second end of the diaphragm is attached, wherein the first attachment case is fitted on an outer periphery of the cylinder, the first attachment case includes an inner-diameter step portion brought into abutting contact with an upper end portion of the cylinder in an axial direction, and the second attachment case is fixed to the piston rod.

[2] The damper with the air spring according to [1], may have a configuration in which the first attachment case is fitted on the outer periphery of the cylinder via an O-ring provided on an inner periphery of the first attachment case.

[3] The damper with the air spring according to [1] or [2], may further comprises: a first non-removable fixing band wound around the first end of the diaphragm that seals and fixes the first end of the diaphragm to an outer periphery of the first attachment case.

[4] The damper with the air spring according to any one of [1] to [3], may have a configuration in which the second attachment case includes an attachment cylinder portion attached to a reduced diameter portion of the piston rod in an inserted manner, and the attachment cylinder portion of the second attachment case is fastened between a nut attached to the reduced diameter portion in a threaded manner and an outer-diameter step portion at a base of the reduced diameter portion.

[5] The damper with the air spring according to any one of [1] to [4], may have a configuration in which the second attachment case includes an external cylinder portion to which the second end of the diaphragm is attached and an internal cylinder portion extending around an outer diameter of the piston rod, and the second attachment case includes a bump rubber fixed in an annular space between the external cylinder portion and the internal cylinder portion.

[6] The damper with the air spring according to any one of [1] to [5], may further comprises: a second non-removable fixing band wound around the second end of the diaphragm that seals and fixes the second end of the diaphragm to an outer periphery of the second attachment case.

With the configuration of [1], simply by fitting the first attachment case to which the first end of the diaphragm is attached, over the outer periphery of the cylinder, and bringing the inner-diameter step portion of the first attachment case into abutting contact with the upper end portion of the cylinder in the axial direction, the first end of the diaphragm can be easily attached to and removed from the cylinder of the damper main body without causing deformation such as welding distortion or crimping distortion in the sliding range of the cylinder within which the piston slides.

In this case, the first attachment case is pressed in the axial direction of the cylinder along with the diaphragm attached to the first attachment case, by a pressure in an air chamber formed by the diaphragm. Thus, the inner-diameter step portion of the first attachment case is stably brought into and kept in abutting contact with the upper end portion of the cylinder.

With the configuration of [2], the o-ring not only seals the air pressure in the air chamber formed by the diaphragm but also tightly contacts the outer periphery of the cylinder in an assembly stage in which the first attachment case is fitted on the outer periphery of the cylinder, thus preventing the first attachment case from slipping out from the outer periphery of the cylinder.

With the configuration of [3], in a sub-assembly stage before the first attachment case is fitted on the outer periphery of the cylinder, the first end of the diaphragm can be easily attached to the first attachment case.

With the configuration of [4], the second end of the diaphragm can be easily attached to and removed from the side of the piston rod of the damper main body.

With the configuration of [5], when the second attachment case is attached to the outer diameter of the piston rod in an inserted manner, the outer diameter of the piston rod can be smoothly inserted into the internal cylinder portion of the second attachment case while being prevented from undergoing insertion resistance from the bump rubber, which has an interference. The interference of the bump rubber is supported by the internal cylinder portion of the second attachment case.

With the configuration of [6], in a sub-assembly stage before the second attachment case is fixed to the piston rod, the second end of the diaphragm can be easily attached to the second attachment case.

DESCRIPTION OF EMBODIMENTS

Figure 1:
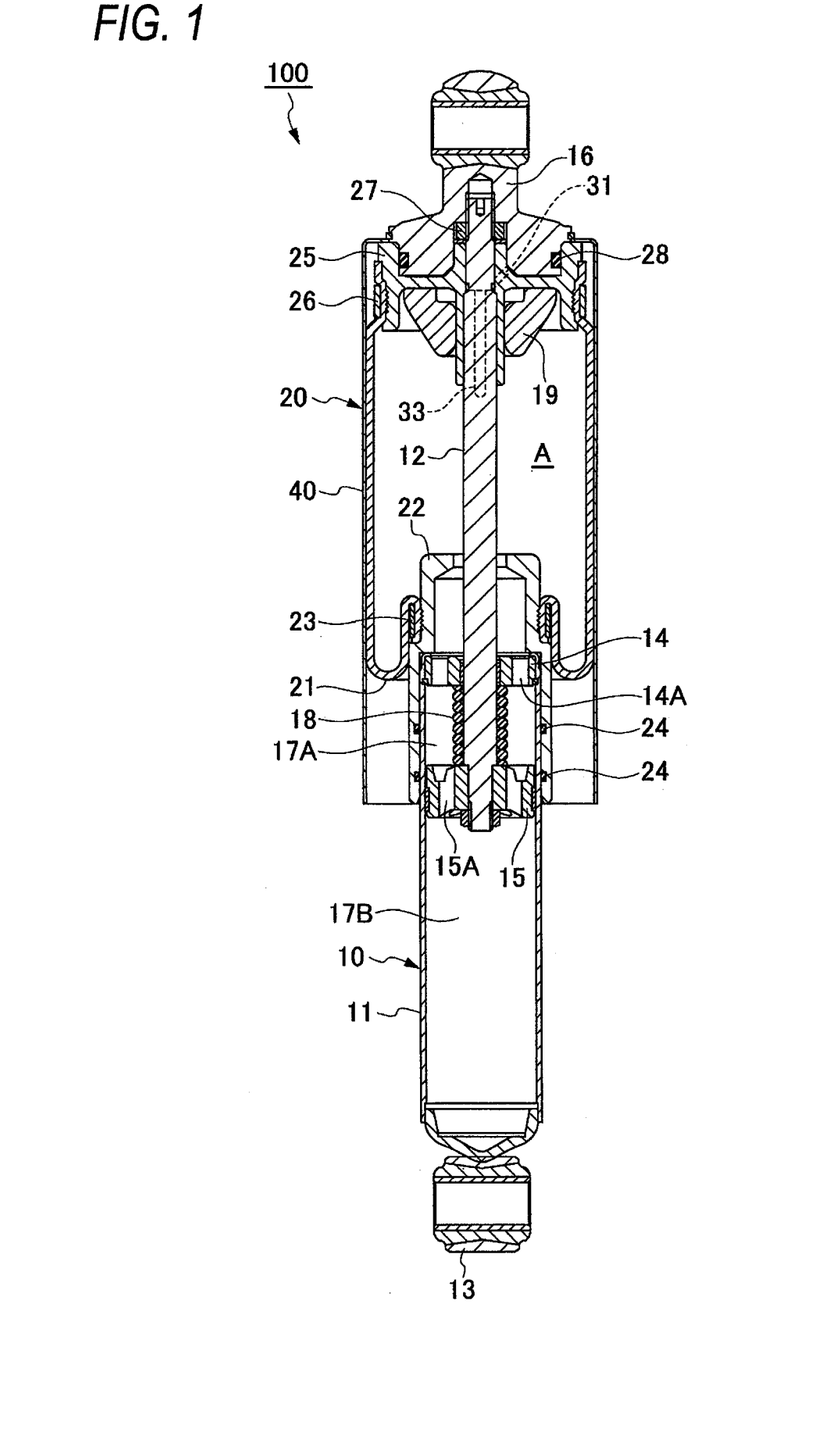
FIG. 1 is a cross-sectional view of a damper with an air spring.
Figure 2:
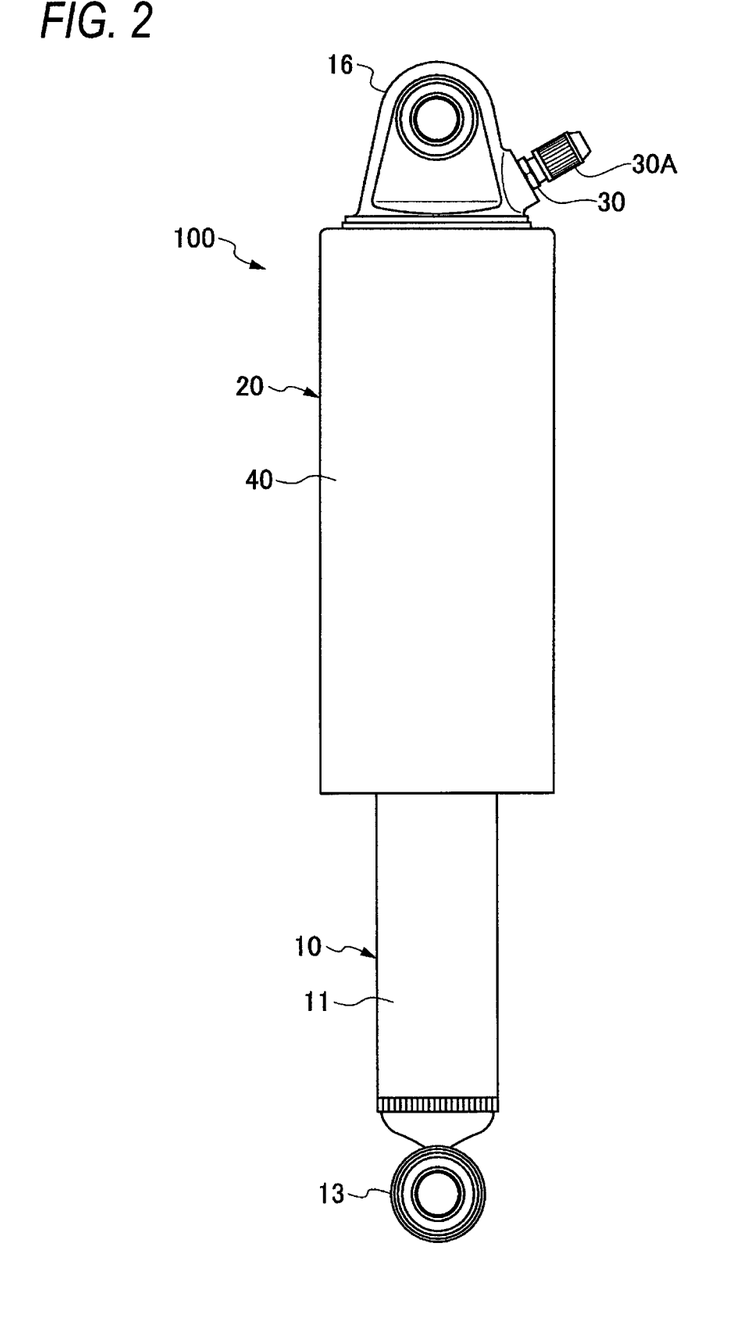
FIG. 2 is a side view of FIG. 1.
Figure 3:
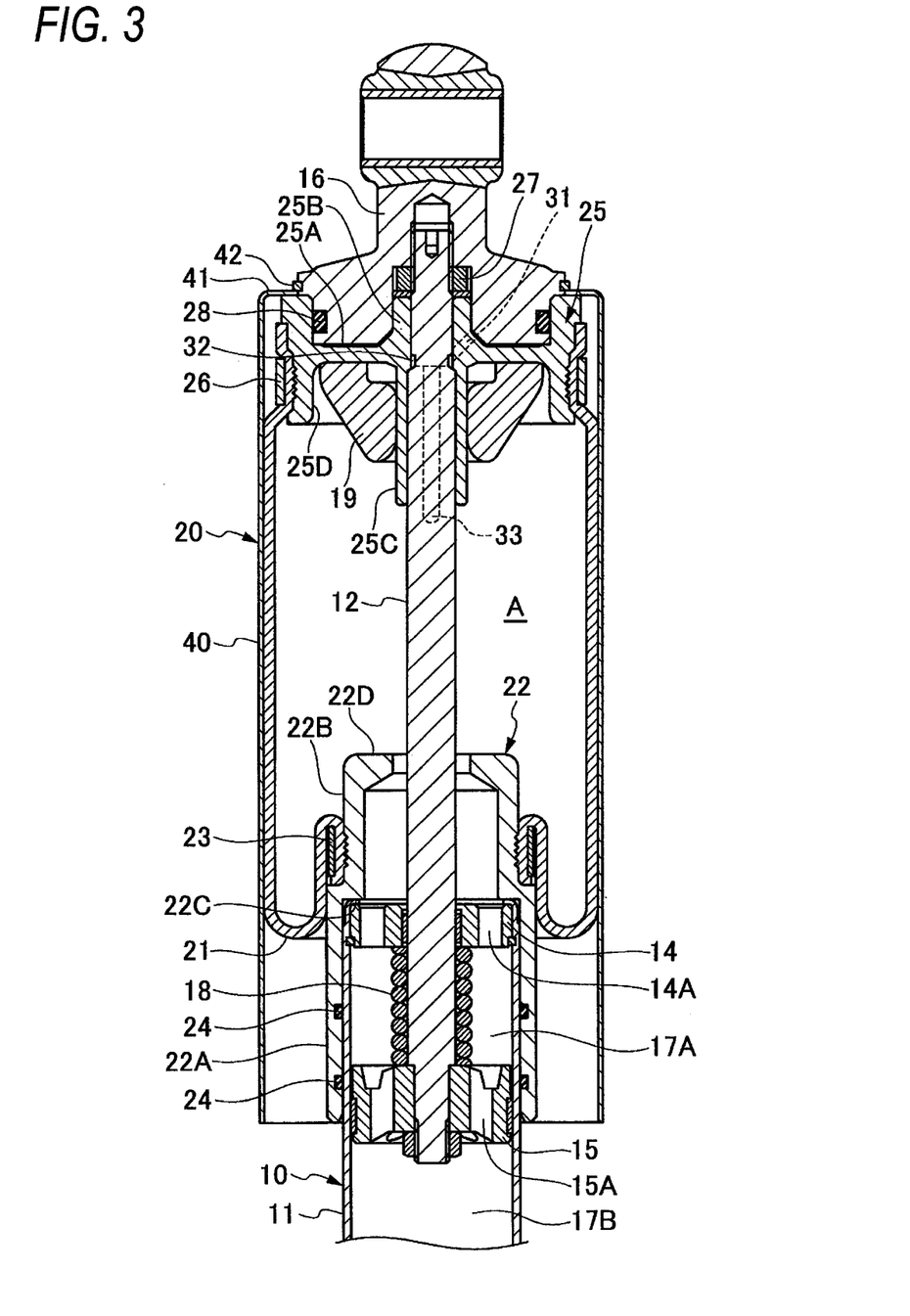
FIG. 3 is an enlarged cross-sectional view of a main part of FIG. 1.

As shown in FIG. 1 to FIG. 3, a damper with an air spring 100 is an assembly of a damper main body 10 and a diaphragm structure 20. The damper main body 10 includes a cylinder 11 and a piston rod 12 that is inserted into the cylinder 11. A diaphragm 21 forming the diaphragm structure 20 is formed of cylindrical rubber and is attached to a side of the cylinder 11 at a first end thereof and to a side of the piston rod 12 at a second end thereof to form an air chamber A around the damper main body 10.

Figure 4:
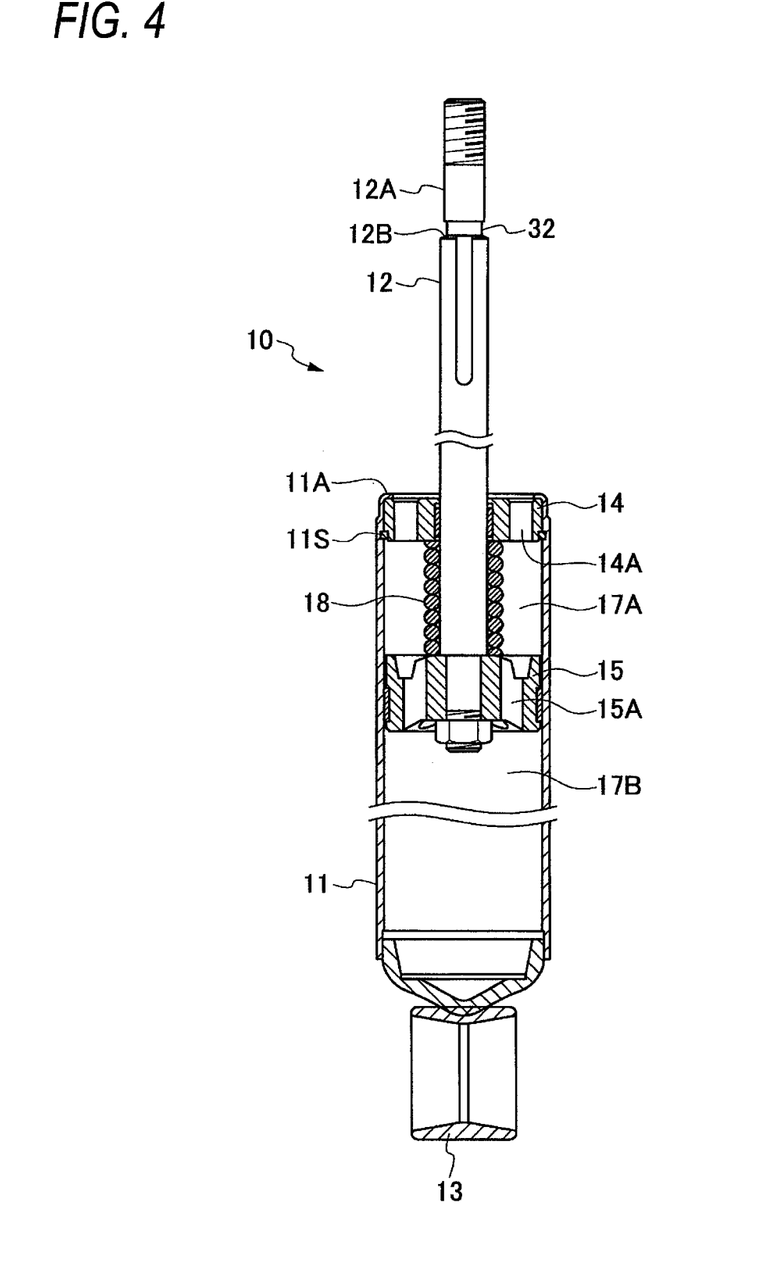
FIG. 4 is a cross-sectional view showing a damper main body.

As shown in FIG. 1 and FIG. 4, the damper main body 10 includes an axle side attachment member 13 attached to a bottom portion of the cylinder 11 and a rod guide 14 fixedly provided in an opening in the cylinder 11. Furthermore, the damper main body 10 includes a piston 15 fixedly provided at an insertion end of the piston rod 12 that is inserted into the cylinder 11 through the rod guide 14. A vehicle body side attachment member 16 is attached to a leading-end reduced diameter portion 12A of the piston rod 12 projecting outward from the cylinder 11.

The damper main body 10 is a greased damper with grease applied to an inner surface of the cylinder 11. The piston 15 includes a communication hole 15A in communication with air chambers 17A and 17B which are arranged vertically side-by-side and into which an internal space in the cylinder 11 is vertically partitioned. In the damper main body 10, when the piston rod 12 extends or retracts with respect to the cylinder 11, the piston 15 moves over the grease on the inner surface of the cylinder 11, thus generating a damping force in association with sliding resistance offered by the grease.

The damper main body 10 includes a rebound spring 18 provided around the piston rod 12 inside the cylinder 11 and between the rod guide 14 and the piston 15 and serving as extension side stroke limiting means. A bump rubber 19 is disposed around a portion of the piston rod 12 to which the diaphragm structure 20 outside the cylinder 11 is attached. The bump rubber 19 serves as compression side stroke limiting means.

Figure 5:
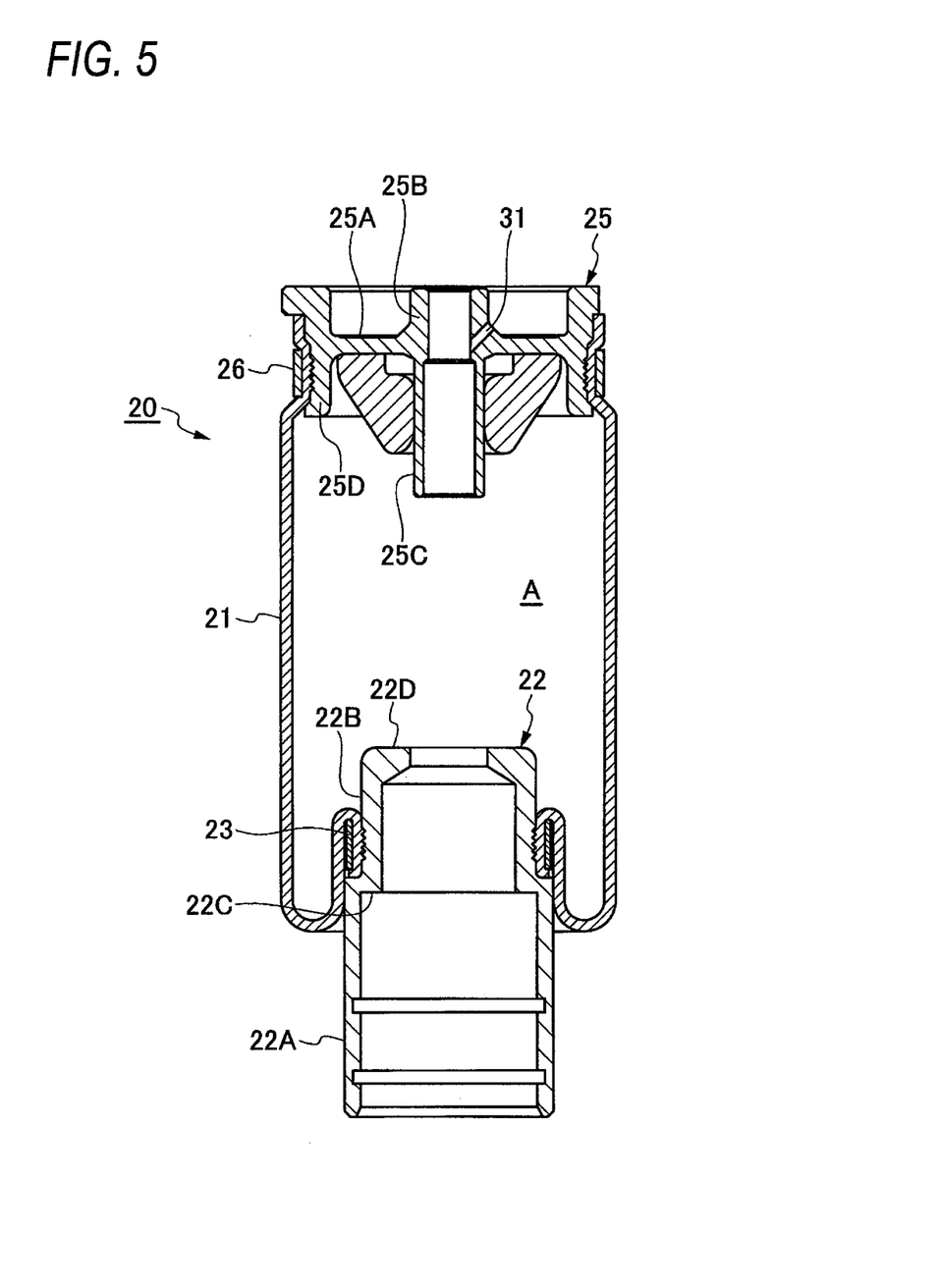
FIG. 5 is a cross-sectional view showing a diaphragm structure.
Figure 6:
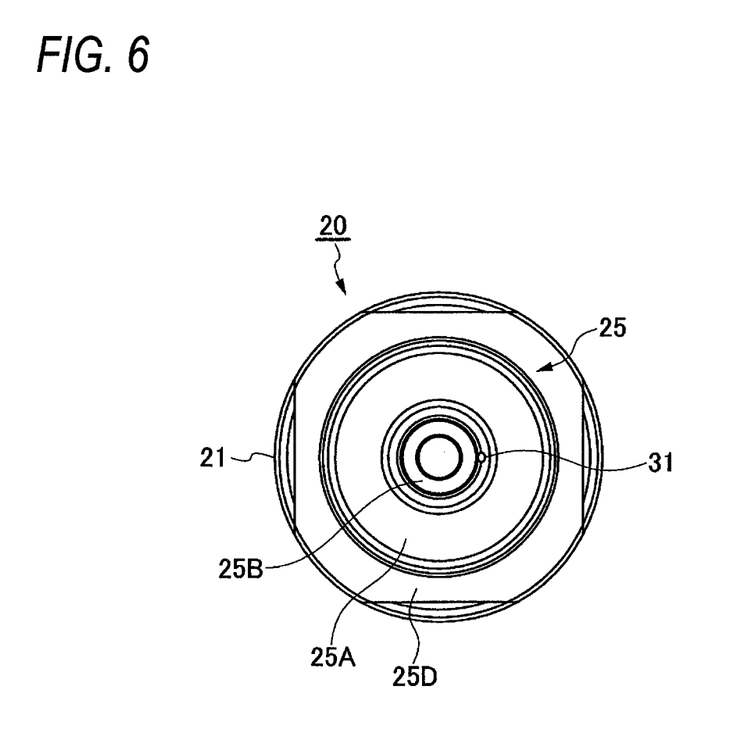
FIG. 6 is a plan view of FIG. 5.

As shown in FIG. 1, FIG. 5, and FIG. 6, the diaphragm structure 20 includes an expanded-diameter cylinder portion 22A of a metallic first attachment case 22, to which a first end of the diaphragm 21 is attached, is fitted to an outer periphery of the cylinder 11. An upper end portion 11A of the cylinder 11 is, in an axial direction, brought into abutting contact with an inner-diameter step portion 22C disposed at a boundary between the expanded-diameter cylinder portion 22A of the first attachment case 22 and a reduced-diameter cylinder portion 22B that is coaxially continuous with the expanded-diameter cylinder portion 22A. The first attachment case 22 includes a bumper rubber stopper portion 22D corresponding to a narrowed leading end portion of the reduced-diameter cylinder portion 22B.

In the diaphragm structure 20, the first end of the diaphragm 21 is attached to a portion of an outer periphery of the reduced-diameter cylinder portion 22B, which is closer to the expanded-diameter cylinder portion 22A, of the first attachment case 22. A metallic non-removable fixing band 23 wound around an outer periphery of the first end of the diaphragm 21 seals and fixes the first end of the diaphragm 21 to the portion of the outer periphery of the reduced-diameter cylinder portion 22B, which is closer to the expanded-diameter cylinder portion 22A, of the first attachment case 22. The portion of the reduced-diameter cylinder portion 22B of the first attachment case 22 to which the first end of the diaphragm 21 is sealed and fixed by the non-removable fixing band 23 is an axially intermediate portion of the reduced-diameter cylinder portion 22B lower than the bumper rubber stopper portion 22D. The non-removable fixing band 23 may be shaped like a C-shaped ring or an annular ring.

Furthermore, the expanded-diameter cylinder portion 22A of the first attachment case 22 includes O-rings 24 fitted in annular grooves formed at two positions on an inner periphery of the expanded-diameter cylinder portion 22A in an axial direction thereof. The first attachment case 22 is tightly fitted on the outer periphery of the cylinder 11 via the O rings 24.

Furthermore, an end surface of the cylinder 11 corresponds to the upper end portion 11A of the cylinder 11 against which the inner-diameter step portion 22C of the first attachment case 22 abuts. The end surface of the cylinder 11 is formed of a clinched portion of the cylinder 11 which fixes the rod guide 14 between the clinched portion and a stopper ring 11S attached to an inner periphery of the cylinder 11 in an engaged manner.

The diaphragm structure 20 fixes the second attachment case 25 with a second end of the diaphragm 21 attached thereto to the piston rod 12. The second attachment case 25 includes an attachment cylinder portion 25B of a small diameter which projects from a central portion of a disc-like portion 25A toward a first side of the second attachment case 25 in an axial direction thereof and an internal cylinder portion 25C of a large diameter which is provided coaxially with the attachment cylinder portion 25B and which projects from an opposite surface of the central portion of the disc-like portion 25A toward a second side of the second attachment case 25 in the axial direction thereof. Furthermore, the second attachment case 25 includes an external cylinder portion 25D projecting from an outer peripheral portion of the disc-like portion 25A toward opposite sides in the axial direction of the second attachment case 25.

In the diaphragm structure 20, the second end of the diaphragm 21 is attached to an outer periphery of the external cylinder portion 25D of the second attachment case 25. A metallic non-removable fixing band 26 wound around an outer periphery of the second end of the diaphragm 21 seals and fixes the second end of the diaphragm 21 to the outer periphery of the external cylinder portion 25D of the second attachment case 25. The non-removable fixing band 26 may be a C-shaped ring or an annular ring.

Furthermore, when the internal cylinder portion 25C of the second attachment case 25 is attached to the piston rod 12 in an inserted manner and the attachment cylinder portion 25B of the second attachment case 25 is attached to the leading-end reduced diameter portion 12A of the piston rod 12 in an inserted manner, an end surface of the attachment cylinder portion 25B at a boundary between the attachment cylinder portion 25B and the internal cylinder portion 25C is brought into abutting contact with an outer-diameter step portion 12B at a base of the leading-end reduced diameter portion 12A of the piston rod 12. The attachment cylinder portion 25B of the second attachment case 25 is fastened between a nut 27 attached, in a threaded manner, to the leading-end reduced diameter portion 12A of the piston rod 12 and the outer-diameter step portion 12B at the base of the leading-end reduced diameter portion 12A.

Furthermore, the second attachment case 25 includes the external cylinder portion 25D to which the second end of the diaphragm 21 is attached and the internal cylinder portion 25C attached to the piston rod 12 in an inserted manner and extending around an outer periphery of the piston rod 12, with the bump rubber 19 fixed in an annular space between the external cylinder portion 25D and the internal cylinder portion 25C. A lower end surface of the bump rubber 19 fixed to the second attachment case 25 is positioned at an axially intermediate position on the internal cylinder portion 25C of the second attachment case 25. At a compression side stroke end of the damper main body 10, a lower end surface of the internal cylinder portion 25C enters a center hole in the bumper rubber stop portion 22D of the first attachment case 22. The lower end surface of the bump rubber 19 fixed to the second attachment case 25 projects downward from an axially lower end position of the external cylinder portion 25D of the second attachment case 25.

With the second attachment case 25 of the diaphragm structure 20 fixed to the piston rod 12 of the damper main body 10 as described above, the vehicle body side attachment member 16 is attached to outer surfaces of the leading-end reduced diameter portion 12A of the piston rod 12 and the outer surface of the second attachment case 25 in a sealed manner. The vehicle body side attachment member 16 is fixedly attached to the leading-end reduced diameter portion 12A of the piston rod 12 in a threaded manner and fitted into the annular space between the attachment cylinder portion 25B and the external cylinder portion 25D of the second attachment case 25. An O ring 28 fitted in an annular groove formed in an outer periphery of the vehicle body side attachment member 16 is attached to an inner periphery of the external cylinder portion 25D in a sealed manner. Air pressure supplied by an air pressure source (not shown) to an air pressure sealing portion 30 (including a plug 30A) provided in the vehicle body side attachment member 16 passes sequentially through a fitting gap sealed against an exterior by the O-ring 28 between the vehicle body side attachment member 16 and the second attachment case 25, a communication hole 31 formed by drilling in the disc-like portion 25A of the second attachment case 25, an annular recess 32 formed at the base of the leading-end reduced diameter portion 12A of the piston rod 12, and a recess groove 33 formed in the outer periphery of the piston rod 12 so as to extend in the axial direction thereof from the outer-diameter step portion 12B at the base of the leading-end reduced diameter portion 12A of the piston rod 12 and beyond the lower end surface of the internal cylinder portion 25C of the second attachment case 25. The air pressure can then be filled into the air chamber A inside the diaphragm 21.

In the damper with the air spring 100 in FIG. 1 and FIG. 2, a cover 40 is provided around the diaphragm 21 of the diaphragm structure 20. An upper flange portion 41 of the cover 40 is sandwiched between an upper end surface of the external cylinder portion 25D of the second attachment case 25 and a stopper ring 42 attached to the outer periphery of the vehicle body side attachment member 16 in an engaged manner. The cover 40 extends downward around the diaphragm 21 beyond a lower end of the diaphragm 21.

In the damper with the air spring 100, the attachment diameter of the second attachment case 25 to which the second end of the diaphragm 21 of the diaphragm structure 20 is attached is set larger than the attachment diameter of the first attachment case 22 to which the first end of the diaphragm 21 of the diaphragm structure 20 is attached. Thus, the first end side of the diaphragm 21 which is attached to the first attachment case 22 extends downward in the axial direction (away from the second attachment case 25), and the diaphragm 21 is folded back at the end of the downward extension in such a manner as to make a U-turn. The second end side of the diaphragm 21 extends upward (closer to the second attachment case 25), and the end of the upward extension corresponding to the second end is attached to the second attachment case 25. As the damper main body 10 extends or retracts, the diaphragm 21 rolls up and down along the outer periphery of the cylinder 11 inside the cover 40. However, the diaphragm 21 according to the embodiment of the present invention is not limited to the rolling diaphragm.

The damper with the air spring 100 is assembled as follows. The first attachment case 22 to which the first end of the diaphragm 21 of the diaphragm structure 20 is attached is fitted on the outer periphery of the cylinder 11 of the damper main body 10 via the O ring 24. The inner-diameter step portion 22C of the first attachment case 22 is brought into abutting contact with the upper end portion (the end surface of the cylinder 11) of the cylinder 11 in the axial direction. Furthermore, the second attachment case 25 to which the second end of the diaphragm 21 is attached is fixed to the leading-end reduced diameter portion 12A of the piston rod 12 of the damper main body 10. Moreover, the vehicle body side attachment member 16 is attached to the leading-end reduced diameter portion 12A of the piston rod 12 and the second attachment case 25 via the O ring 28 in a sealed manner. In this assembled state, the diaphragm 21 forms the air chamber A around the piston rod 12. The air pressure filled in the air chamber A forms an air spring elastically snaps the damper main body 10 in a direction in which the damper main body 10 extends, and exerts a spring force according to a change in the volume of the air chamber A in conjunction with extension and retraction of the damper main body 10.

The thus assembled damper with the air spring 100 has a damping function provided by the damper main body 10 and an air spring function provided by the air pressure filled in the air chamber A in the diaphragm 21 of the diaphragm structure 20. The spring constant of the air spring can be changed by adjusting the air pressure supplied by the air pressure sealing portion 30 to the air chamber A. If the spring constant of the air spring need not be changed, the air pressure sealing portion 30 is closed with a plug 30A to seal the air chamber A.

Furthermore, in the damper with the air spring 100, the diaphragm structure 20 is removed from the damper main body 10 when, for example, the damper main body 10 needs to be inspected. That is, the vehicle body side attachment member 16 is removed from the leading-end reduced diameter portion 12A of the piston rod 12 and the second attachment case 25. The nut 27 is removed from the leading-end reduced diameter portion 12A of the piston rod 12. The second attachment case 25 is pulled out from the piston rod 12. Moreover, the first attachment case 22 is pulled out from the cylinder 11. Then, the whole diaphragm structure 20 can be easily dismantled from the damper main body 10.

In the damper main body 10 according to the present embodiment, the rod guide 14 includes a communication hole 14A, and thus the air chamber A in the diaphragm 21 of the diaphragm structure 20 is in communication with the air chambers 17A and 17B in the damper main body 10. This reduces the compression ratio of the damper main body 10. If the communication hole 14A is not formed in the rod guide 14, when the damper main body 10 with an oil seal or the like provided in the rod guide 14 is to be inspected for aged deterioration, etc. of the oil seal or the like, the diaphragm structure 20 may be dismantled from the damper main body 10 as described above for inspection.

The present embodiment can produce the following effects.

(a) Simply by fitting the first attachment case 22 to which the first end of the diaphragm 21 is attached, over the outer periphery of the cylinder 11, and bringing the inner-diameter step portion 22C of the first attachment case 22 into abutting contact with the upper end portion 11A of the cylinder 11 in the axial direction thereof, the first end of the diaphragm 21 can be easily attached to and removed from a side of the cylinder 11 of the damper main body 10 without causing deformation such as welding distortion or crimping distortion in the sliding range of the cylinder 11 within which the piston 15 slides.

In this case, the first attachment case 22 is pressed in the axial direction of the cylinder 11 along with the diaphragm 21 attached to the first attachment case 22, by the pressure in the air chamber A formed by the diaphragm 21. Thus, the inner-diameter step portion 22C of the first attachment case 22 is stably brought into and kept in abutting contact with the upper end portion 11A of the cylinder 11.

(b) The first attachment case 22 is fitted on the outer periphery of the cylinder 11 via the O ring 24 provided on the inner periphery of the first attachment case 22. The O ring 24 not only seals the air pressure in the air chamber A formed by the diaphragm 21 but also tightly contacts the outer periphery of the cylinder 11 in an assembly stage in which the first attachment case 22 is fitted on the outer periphery of the cylinder 11, thus preventing the first attachment case 22 from slipping out from the outer periphery of the cylinder 11.

(c) The non-removable fixing band 23 wound around the first end of the diaphragm 21 seals and fixes the first end of the diaphragm 21 to the outer periphery of the first attachment case 22. In a sub-assembly stage before the first attachment case 22 is fitted on the outer periphery of the cylinder 11, the first end of the diaphragm 21 can be easily attached to the first attachment case 22.

(d) The attachment cylinder portion 25B of the second attachment case 25 is attached to the reduced diameter portion 12A of the piston rod 12 in an inserted manner, and the attachment cylinder portion 25B of the second attachment case 25 is fastened between the nut 27 attached to the reduced diameter portion 12A in a threaded manner and the outer-diameter step portion 12B at the base of the reduced diameter portion 12A. The second end of the diaphragm 21 can be easily attached to and removed from the side of the piston rod 12 of the damper main body 10.

(e) The second attachment case 25 includes the external cylinder portion 25D to which the second end of the diaphragm 21 is attached and the internal cylinder portion 25C extending around the outer diameter of the piston rod 12, and the bump rubber 19 is fixed in the annular space between the external cylinder portion 25D and the internal cylinder portion 25C. When the second attachment case 25 is attached to the outer diameter of the piston rod 12 in an inserted manner, the outer diameter of the piston rod 12 can be smoothly inserted into the internal cylinder portion 25C of the second attachment case 25 while being prevented from undergoing insertion resistance from the bump rubber 19, which has an interference. The interference of the bump rubber 19 is supported by the internal cylinder portion 25C of the second attachment case 25.

(f) The non-removable fixing band 26 wound around the second end of the diaphragm 21 seals and fixes the second end of the diaphragm 21 to the outer periphery of the second attachment case 25. In a sub-assembly stage before the second attachment case 25 is fixed to the piston rod 12, the second end of the diaphragm 21 can be easily attached to the second attachment case 25.

The embodiment of the present invention has been described in detail with reference to the drawings. However, the specific configuration of the present invention is not limited to this embodiment. The embodiment subjected to a change or the like without departing from the spirit of the present invention is included in the present invention. For example, the damper with the air spring according to the embodiment of the present invention is not limited to the damper main body forming a grease damper but may include a damper main body forming an oil damper.

The embodiment of the present invention provides a damper with an air spring, including a damper main body with a cylinder and a piston rod interposed in the cylinder and a cylindrical diaphragm which is attached to a side of the cylinder at a first end thereof and to a side of the piston rod at a second end thereof to form an air chamber around the damper main body, wherein a first attachment case to which the first end of the diaphragm is attached is fitted on an outer periphery of the cylinder, and an inner-diameter step portion of the first attachment case is brought into abutting contact with an upper end portion of the cylinder in an axial direction to fix a second attachment case to which the second end of the diaphragm is attached, to the piston rod. Thus, in the damper with the air spring, the first side of the diaphragm can be easily attached to the cylinder of the damper main body.

What is claimed is:

1. A damper with an air spring, comprising:
   a damper main body having a cylinder and a piston rod inserted into the cylinder, the cylinder forming a first air chamber;
   a cylindrical diaphragm attached to a side of the cylinder at a first end thereof and to a side of the piston rod at a second end thereof and forming a second air chamber around the damper main body;
   a first attachment case to which the first end of the diaphragm is attached; and
   a second attachment case to which the second end of the diaphragm is attached,
   wherein the first attachment case is fitted on an outer periphery of the cylinder,
   the first air chamber and the second air chamber are in fluid communication,
   the first attachment case includes a first cylinder portion and a second cylinder portion coaxially continuous with the first cylinder portion,
   an inner diameter of the second cylinder portion is smaller than that of the first cylinder portion to form an inner-diameter step portion between the first cylinder portion and the second cylinder portion, the inner-diameter step portion is brought into abutting contact with an upper end surface of the cylinder of the damper main body in an axial direction, the upper end surface being provided at an uppermost end of the cylinder, the first end of the diaphragm is attached to an outer periphery of the second cylinder portion of the first attachment case, the second attachment case is fixed to the piston rod, and the second cylinder portion is provided above the upper end surface in the axial direction.

2. The damper with the air spring according to claim 1, wherein the first attachment case is fitted on the outer periphery of the cylinder via an O-ring provided on an inner periphery of the first attachment case.

3. The damper with the air spring according to claim 1, further comprising:

a first fixing band wound around the first end of the diaphragm that seals and fixes the first end of the diaphragm to an outer periphery of the first attachment case.

4. The damper with the air spring according to claim 1, wherein the second attachment case includes an attachment cylinder portion attached to a reduced diameter portion of the piston rod in an inserted manner, and the attachment cylinder portion of the second attachment case is fastened between a nut attached to the reduced diameter portion in a threaded manner and an outer-diameter step portion at a base of the reduced diameter portion.

5. The damper with the air spring according to claim 1, wherein the second attachment case includes an external cylinder portion to which the second end of the diaphragm is attached and an internal cylinder portion extending around an outer diameter of the piston rod, and the second attachment case includes a bump rubber fixed in an annular space between the external cylinder portion and the internal cylinder portion.

6. The damper with the air spring according to claim 3, further comprising:

a second fixing band wound around the second end of the diaphragm that seals and fixes the second end of the diaphragm to an outer periphery of the second attachment case.

7. The damper with the air spring according to claim 1, further comprising:

a fixing band wound around the second end of the diaphragm that seals and fixes the second end of the diaphragm to an outer periphery of the second attachment case.

* * * * *